(12) United States Patent
Leng

(10) Patent No.: US 12,446,701 B2
(45) Date of Patent: Oct. 21, 2025

(54) BED SKELETON OF IRON FRAME BED

(71) Applicant: Luhao Leng, Xiamen (CN)

(72) Inventor: Luhao Leng, Xiamen (CN)

(*) Notice: Subject to any disclaimer, the term of this patent is extended or adjusted under 35 U.S.C. 154(b) by 424 days.

(21) Appl. No.: 17/967,977

(22) Filed: Oct. 18, 2022

(65) Prior Publication Data

US 2023/0371700 A1 Nov. 23, 2023

(30) Foreign Application Priority Data

May 19, 2022 (CN) .......................... 202221205192.6

(51) Int. Cl.
| | | |
|---|---|---|
| A47C 19/00 | (2006.01) | |
| A47C 19/02 | (2006.01) | |
| A47C 19/12 | (2006.01) | |
| F16B 12/56 | (2006.01) | |

(52) U.S. Cl.
CPC .......... *A47C 19/005* (2013.01); *A47C 19/027* (2013.01); *A47C 19/122* (2013.01); *F16B 12/56* (2013.01)

(58) Field of Classification Search
CPC ....... A47C 19/00; A47C 19/005; A47C 19/02; A47C 19/027; A47C 19/122; F16B 12/00; F16B 12/56; F16B 12/54
See application file for complete search history.

(56) References Cited

U.S. PATENT DOCUMENTS

| | | | |
|---|---|---|---|
| 1,694,885 A | 12/1928 | Matheson | |
| 5,694,656 A * | 12/1997 | Huang | A47C 19/005 |
| | | | 403/258 |
| 2005/0278849 A1 | 12/2005 | Polevoy | |
| 2009/0271924 A1 | 11/2009 | Leng | |
| 2010/0180379 A1 | 7/2010 | Leng | |
| 2016/0206110 A1 | 7/2016 | Oh | |

(Continued)

FOREIGN PATENT DOCUMENTS

| | | | |
|---|---|---|---|
| CN | 2508633 Y | | 9/2002 |
| CN | 201288732 Y | * | 8/2009 |

(Continued)

OTHER PUBLICATIONS

Non-Final Office Action cited in U.S. Appl. No. 17/967,256, mailed Mar. 20, 2025, 11 pages.

(Continued)

*Primary Examiner* — Fredrick C Conley
(74) *Attorney, Agent, or Firm* — Cooper Legal Group, LLC

(57) ABSTRACT

A bed skeleton of an iron frame bed comprises a rectangular frame, a plurality of frame rods, and two or three longitudinal beams. The rectangular frame comprises two transverse rods and two longitudinal rods. A length of each of the two transverse rods is greater than a length of each of the two longitudinal rods. The two or three longitudinal beams divide the rectangular frame into three or four individual cells. The plurality of frame rods are evenly disposed in the three or four individual cells. Each of the plurality of frame rods is arranged transversely. A length of each of the plurality of frame rods is shorter than a length of each of the two or three longitudinal beams, and each end of each of the plurality of frame rods is connected to one of the two longitudinal rods or one of the two or three longitudinal beams.

12 Claims, 7 Drawing Sheets

(56) References Cited

U.S. PATENT DOCUMENTS

| | | |
|---|---|---|
| 2017/0188716 A1 | 7/2017 | Leng |
| 2017/0208955 A1 | 7/2017 | Lee |
| 2018/0055235 A1 | 3/2018 | Choi |
| 2018/0110339 A1 | 4/2018 | Moon |
| 2018/0125255 A1* | 5/2018 | Jin .................. A47C 19/024 |
| 2018/0360225 A1 | 12/2018 | Leng |
| 2018/0372138 A1* | 12/2018 | Li ..................... A47C 19/20 |
| 2019/0024691 A1 | 1/2019 | Leng |
| 2020/0018337 A1 | 1/2020 | Niederkofler |
| 2020/0375367 A1 | 12/2020 | Qiu |
| 2020/0390233 A1 | 12/2020 | Leng |

FOREIGN PATENT DOCUMENTS

| | | |
|---|---|---|
| CN | 201418570 Y | 3/2010 |
| CN | 204670766 U | 9/2015 |
| CN | 204708384 U | 10/2015 |
| CN | 205493264 U | 8/2016 |
| CN | 205625335 U | 10/2016 |
| CN | 206586698 U | 10/2017 |
| CN | 209135912 U | 7/2019 |

OTHER PUBLICATIONS

Non-Final Office Action cited in U.S. Appl. No. 17/967,966, mailed Jan. 16, 2025, 19 pages.

First CN Office Action cited in CN202210546785.7, mailed Jan. 2, 2024, 10 pages.

Second CN Office Action cited in CN202210546785.7, mailed May 18, 2024, 14 pages.

Rejection Decision cited in CN202210546785.7, mailed Aug. 30, 2024, 11 pages.

* cited by examiner

BED SKELETON OF IRON FRAME BED

RELATED APPLICATIONS

This application claims priority to Chinese patent application number 202221205192.6, filed on May 19, 2022. Chinese patent application number 202221205192.6 is incorporated herein by reference.

FIELD OF THE DISCLOSURE

The present disclosure relates to a bed skeleton, and in particular to a bed skeleton of an iron frame bed.

BACKGROUND OF THE DISCLOSURE

A bed skeleton of an iron frame bed comprises a rectangular metal frame and a plurality of metal frame rods. The rectangular metal frame is surrounded and defined by two transverse rods symmetrically parallel to each other and two longitudinal rods symmetrically parallel to each other. The two transverse rods correspond to a direction of people laying down when sleeping. The two longitudinal rods correspond to a width direction of the bed skeleton, so a length of each of the two transverse rods is greater than a length of each of the two longitudinal rods. The plurality of metal frame rods are connected between the two transverse rods, so the plurality of metal frame rods are arranged longitudinally and spaced apart from one another.

Since each of the plurality of metal frame rods is much thinner than each of two transverse rods or each of the two longitudinal rods, strength and hardness of the plurality of metal frame rods are weak, and bending deformation is more likely to occur. In other words, the plurality of metal frame rods can be broken apart with a relatively small lateral force. In fact, there is a special detection method for confirming that the plurality of metal frame rod meet design requirements, which is to insert a cone block from top to bottom between two adjacent metal frame rods of the plurality of metal frame rods and then apply a fixed downward test force. If the cone block can be forced through the two adjacent metal frame rods, the strength of the bed skeleton does not meet the design requirements. Therefore, in order to the design test requirements, the existing structural design adds connecting pieces at a middle position of each of the plurality of metal frame rods. That is, the middle positions of the two adjacent metal frame rods are connected by the connecting pieces, and finally all of the plurality of metal frame rods are interwoven through the connecting pieces, so that the connecting pieces can limit the lateral deformation of each of the plurality of metal frame rods. Of course, some people easily believe that directly thickening each of the plurality of metal frame rods or reducing a gap of the two adjacent metal frame rods can improve its deformation ability. But profit is very limited for the iron frame bed, so thickening each of the plurality of metal frame rods or increasing a quantity of the plurality of metal frame rods will increase the weight of the product and increase the production cost, and the control of the production cost will directly determine the competitiveness of the product, so no manufacturer will probably directly thicken each of the plurality of metal frame rods and increase the number of metal frame rods.

In this regard, those skilled in the art are still continuously thinking about how to obtain a better structural design and further improve the strength of the bed skeleton on the premise of ensuring product competitiveness.

BRIEF SUMMARY OF THE DISCLOSURE

The present disclosure provides a bed skeleton of an iron frame bed, which improves the strength without increasing the overall weight.

In order to solve the technical problem, a first technical solution of the present disclosure is as follows.

A bed skeleton of an iron frame bed comprises a rectangular frame, a plurality of frame rods, and two or three longitudinal beams. The rectangular frame comprises two transverse rods symmetrically parallel to each other in a front-and-rear direction and two longitudinal rods symmetrically parallel to each other in a left-and-right direction. A length of each of the two transverse rods is greater than a length of each of the two longitudinal rods. The two or three longitudinal beams divide the rectangular frame into three or four individual cells, and the plurality of frame rods are evenly disposed in the three or four individual cells. Each of the plurality of frame rods is arranged transversely. A length of each of the plurality of frame rods is shorter than a length of each of the two or three longitudinal beams, and each end of each of the plurality of frame rods is connected to one of the two longitudinal rods or one of the two or three longitudinal beams.

Each of the plurality of frame rods is arranged transversely and connected between one of the two longitudinal rods and one of the two longitudinal beams, or between the two longitudinal beams. The length of each of the plurality of frame rods is shorter than a distance between the two transverse rods, and the resistance to deformation is greatly improved, so a distance between two adjacent frame rods of the plurality of frame rods can be larger than the existing structure and a length of all of the plurality of frame rods transversely arranged is much shorter than a length of a plurality of frame rods longitudinally arranged in the existing structure. The material saved from the plurality of frame rods is enough to offset the two or three longitudinal beams, so an overall weight of the bed skeleton is not increased, the bed skeleton can even be lighter than before, and the strength is improved. In addition, there is no need to provide additional connecting pieces between the two adjacent frame rods, which further saves costs.

In a preferred embodiment, an inner side of each of the two transverse rods is disposed with one or more U-shaped seats, each end of each of the two or three longitudinal beams is supported on the one or more U-shaped seats, and each end of each of the two or three longitudinal beams and the one or more U-shaped seats are detachably buckled to each other. The one or more U-shaped seats can support the two or three longitudinal beams stably and prevent the two or three longitudinal beams from shaking.

In a preferred embodiment, a left inner side and a right inner side of the one or more U-shaped seats respectively comprise a protruding tongue, a left side and a right side of each end of each of the two or three longitudinal beams respectively comprise a buckle hole, and the protruding tongue is configured to be disposed in the buckle hole. The mating connection between the protruding tongue and the buckle hole can prevent the two or three longitudinal beams from being disengaged upwards, and the assembly is stable.

In a preferred embodiment, a bottom surface of the one or more U-shaped seats comprises a position-limiting block, a bottom surface of each end of each of the two or three longitudinal beams comprises a position-limiting hole, and the position-limiting block is configured to be disposed in the position-limiting hole. The mating connection between the position-limiting block and the position-limiting hole enables the two or three longitudinal beams to be fixedly connected to the two transverse rods, so as to ensure a constant distance between the two transverse rods and improve the overall stability of the bed skeleton.

In a preferred embodiment, each end of each of the plurality of frame rods is folded down vertically to form a vertical hook, each of the two longitudinal rods and each of the two or three longitudinal beams comprise insertion holes, and the vertical hook is configured to be disposed in a corresponding one of the insertion holes.

In a preferred embodiment, each end of each of the plurality of frame rods is flattened and folded down to form the vertical hook, a plastic buckle is disposed in each of the insertion holes, the plastic buckle comprises one or more slots, and the vertical hook is configured to be disposed in the one or more slots.

In a preferred embodiment, an anti-releasing structure is disposed between the vertical hook and the plastic buckle.

In a preferred embodiment, some of the one or more slots of the plastic buckle disposed on the two or three longitudinal beams are two slots.

In a preferred embodiment, each end of each of the two transverse rods and each end of each of the two longitudinal rods are directly connected to each other, or each end of each of the two transverse rods and each end of each of the two longitudinal rods are transitionally connected to each other through an upright column.

In a preferred embodiment, each end of each of the two transverse rods and each end of each of the two longitudinal rods are transitionally connected to each other through an upright column, each of the two transverse rods is configured to be folded in half, the two or three longitudinal beams are two longitudinal beams, the two longitudinal beams divide the rectangular frame into three individual cells, each end of each of the two longitudinal rods is connected to the upright column, and each end of each of the two transverse rods and the upright column are locked together by bolts. Some of the plurality of frame rods in a middle individual cell of the three individual cells just cross a position at which the two transverse rods is folded in half, which improves the transverse strength, so the strength of the rectangular frame can be improved.

DETAILED DESCRIPTION OF THE EMBODIMENTS

Figure 1:
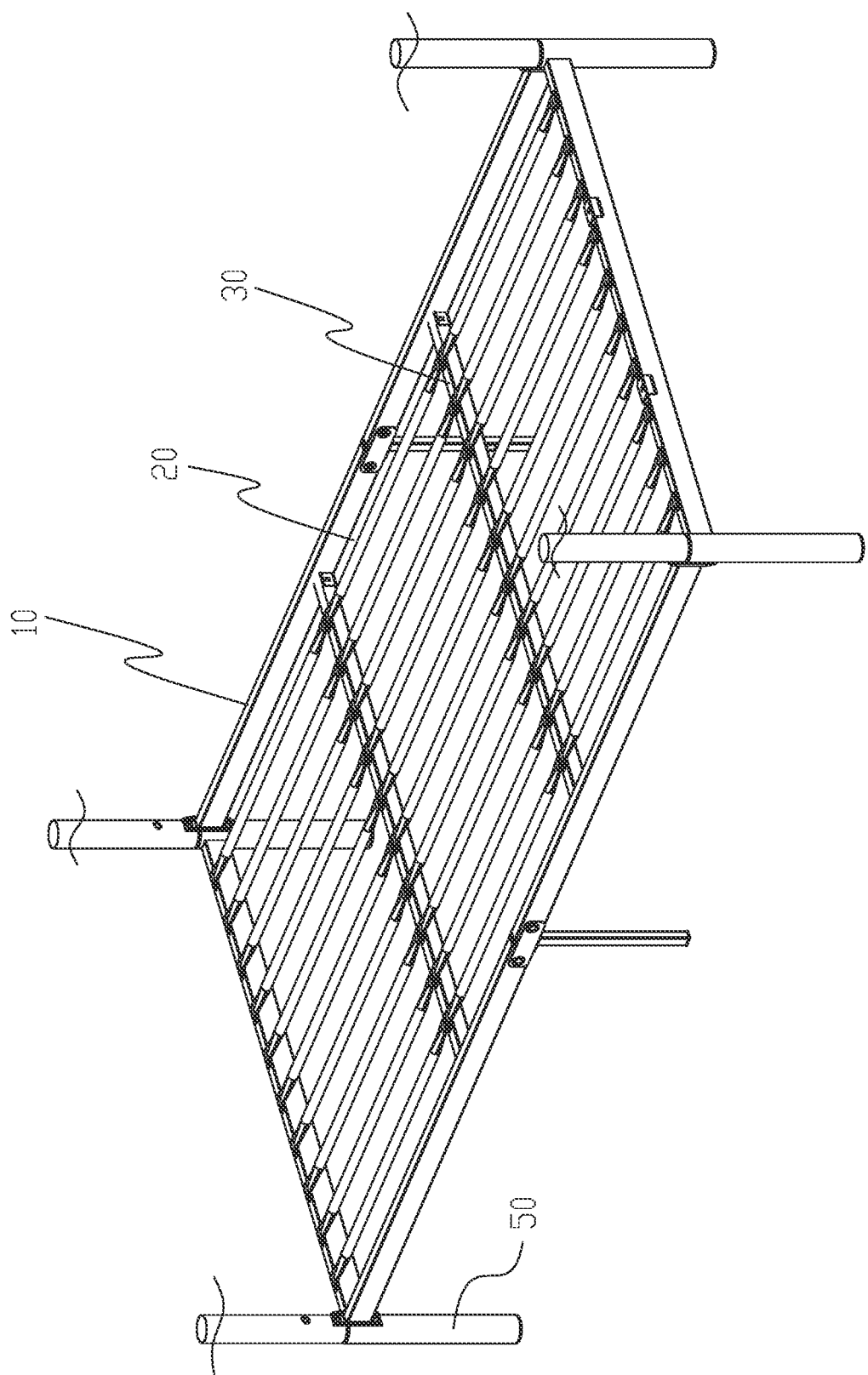
FIG. 1 illustrates a perspective view of a bed skeleton of an iron frame bed in the present disclosure.
Figure 2:
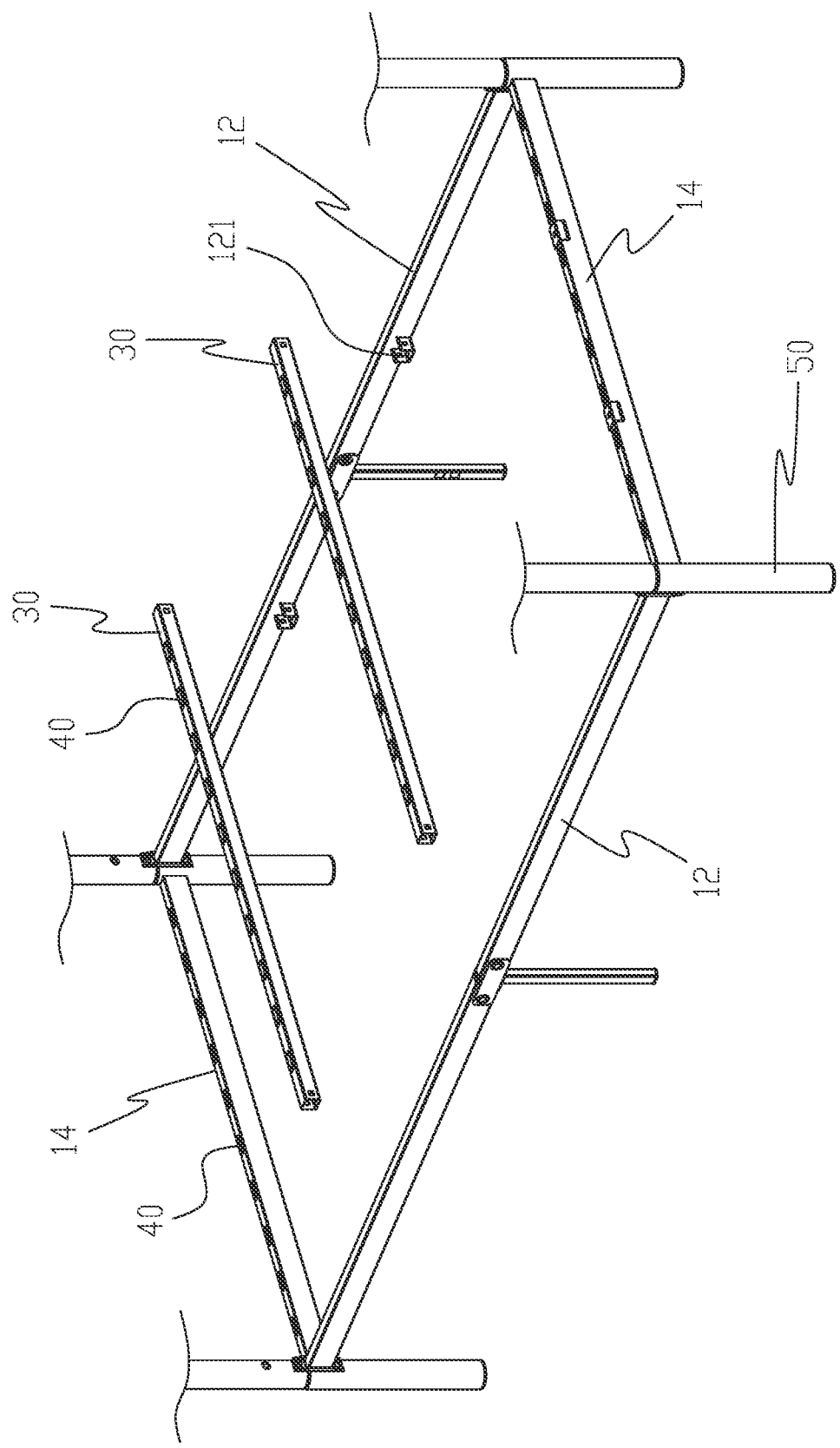
FIG. 2 illustrates a perspective view of the bed skeleton of the iron frame bed in FIG. 1 before a plurality of frame rods and two longitudinal beams is assembled on a rectangular frame.
Figure 5:
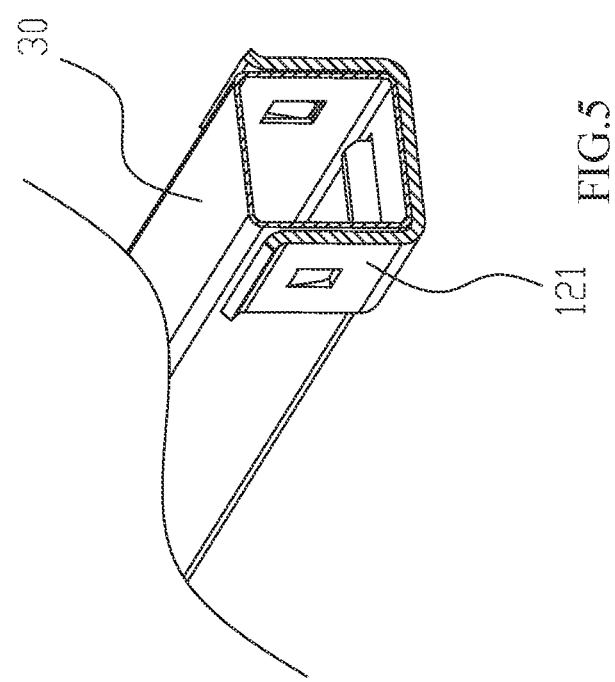
FIG. 5 illustrates a partial perspective view of one of the two longitudinal beams being connected to one or more U-shaped seats of the bed skeleton of the iron frame bed in FIG. 1.
Figure 4:
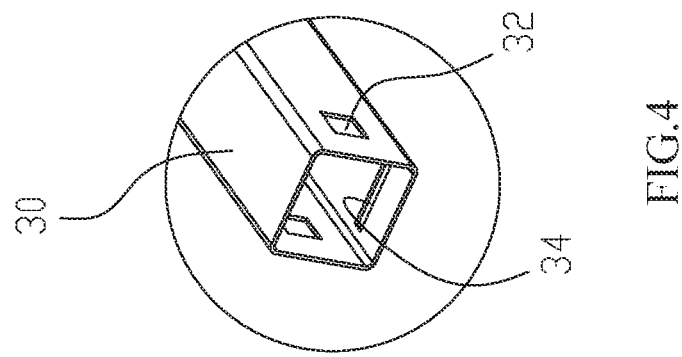
FIG. 4 illustrates a partial perspective view of one of the two longitudinal beams of the bed skeleton of the iron frame bed in FIG. 1.
Figure 3:
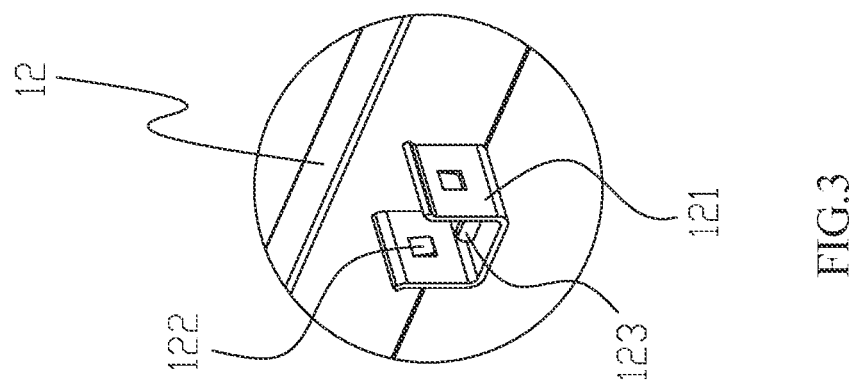
FIG. 3 illustrates a partial perspective view of one of two transverse rods of the bed skeleton of the iron frame bed in FIG. 1.
Figure 6:
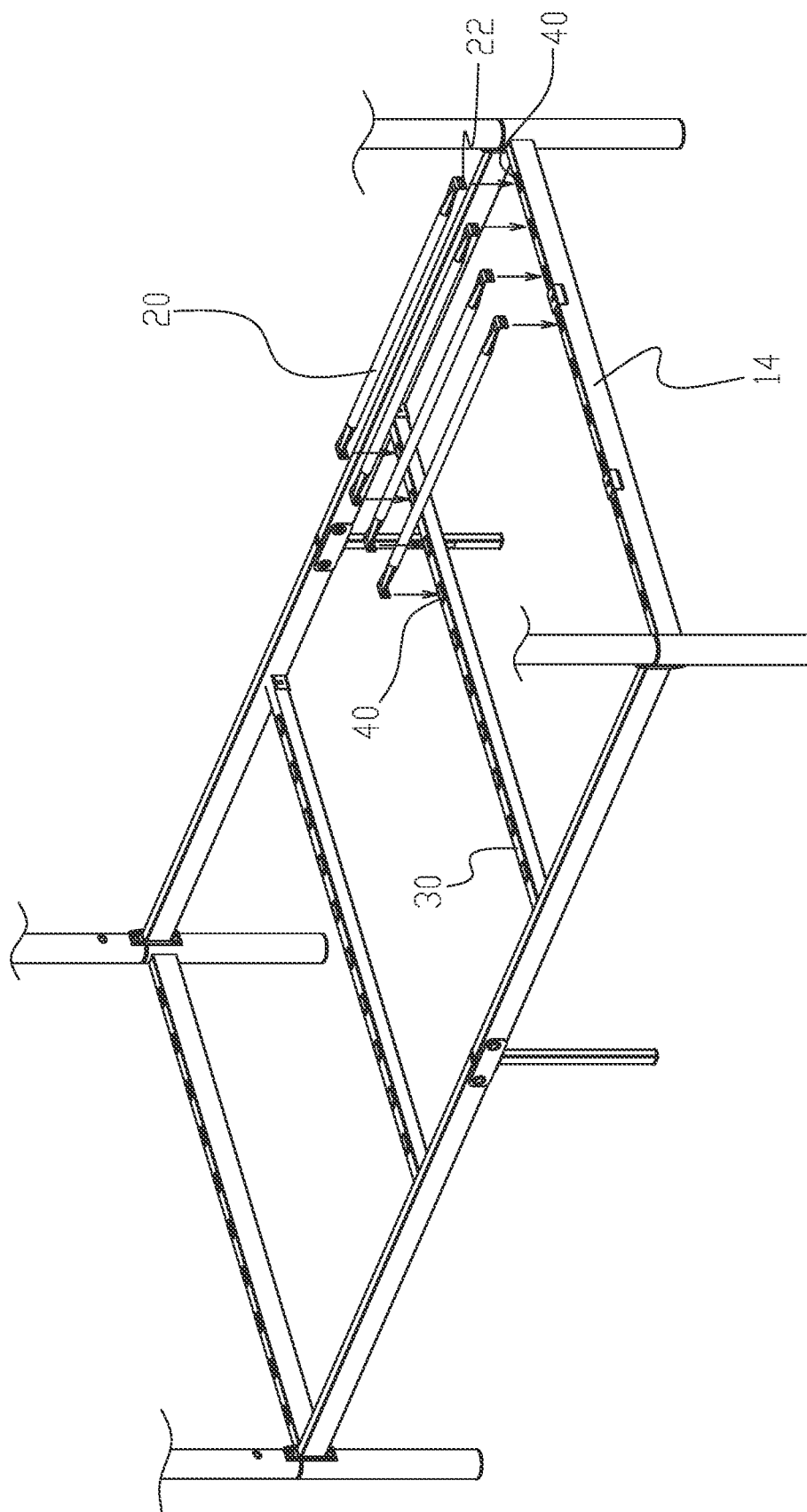
FIG. 6 illustrates a perspective view of the bed skeleton of the iron frame bed in FIG. 1, when the plurality of frame rods are being assembled on the rectangular frame.
Figure 7:
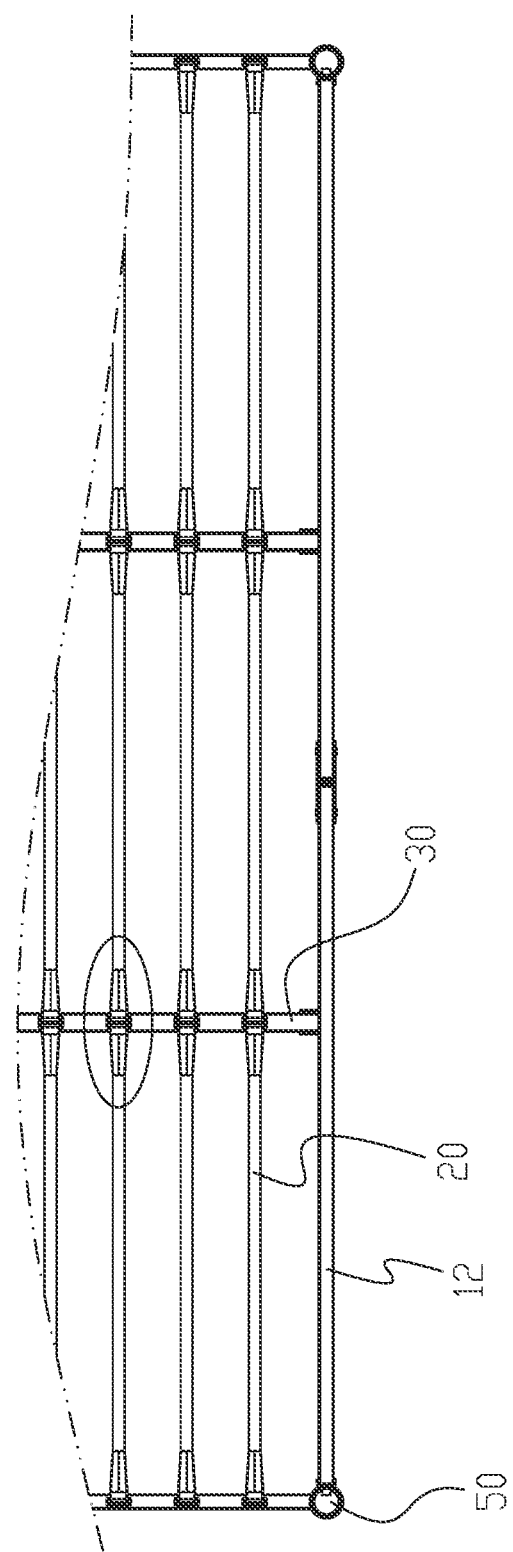
FIG. 7 illustrates a partial top view of the bed skeleton of the iron frame bed in FIG. 1.
Figure 9:
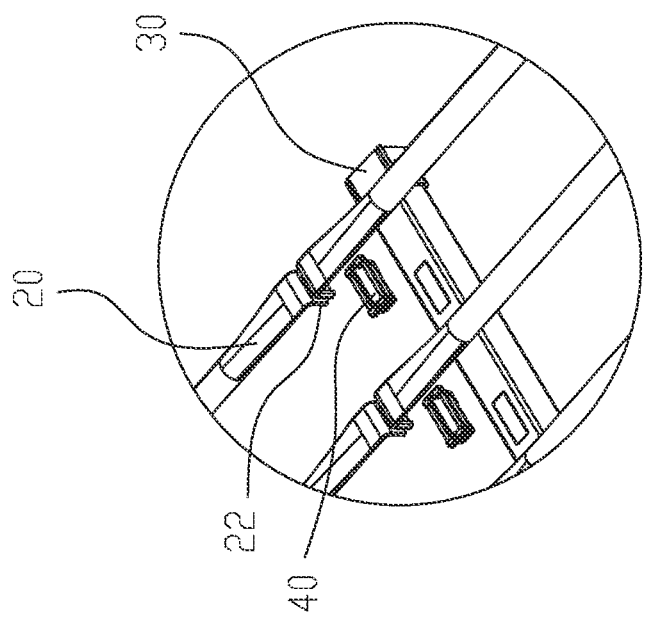
FIG. 9 illustrates a partially exploded view of the two longitudinal beams and the plurality of frame rods in FIG. 1.
Figure 8:
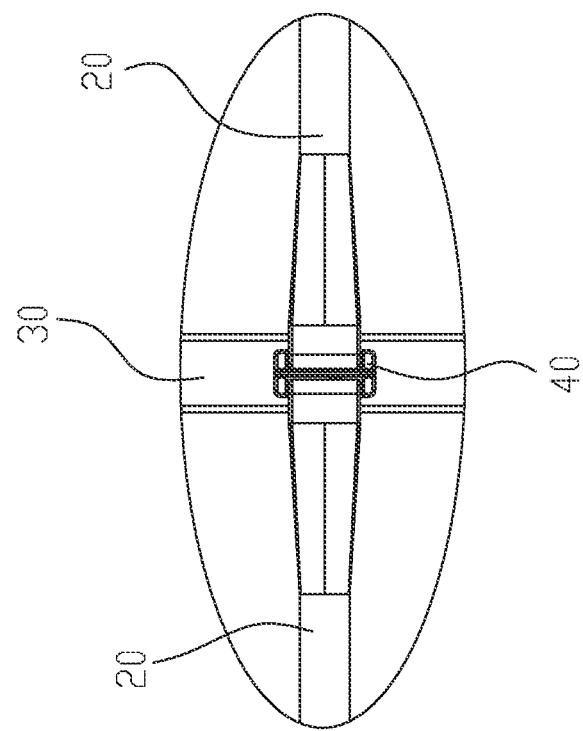
FIG. 8 illustrates an enlarged view of a circled region in FIG. 7.

The present disclosure will be further described below in combination with the accompanying drawings and embodiments.

Referring to FIGS. 1 to 9, a bed skeleton of an iron frame bed comprises a rectangular frame 10 and a plurality of frame rods 20. The rectangular frame 10 comprises two transverse rods 12 symmetrically parallel to each other in a front-and-rear direction and two longitudinal rods 14 symmetrically parallel to each other in a left-and-right direction. A length of each of the two transverse rods 12 is greater than a length of each of the two longitudinal rods 14. That is, the two transverse rods 12 correspond to a length direction of the bed skeleton, and the two longitudinal rods 14 correspond to a width direction of the bed skeleton. The bed skeleton further comprises two longitudinal beams 30 (or three longitudinal beams 30) connected between the two transverse rods 12, and the two longitudinal beams 30 divide the rectangular frame 10 into three individual cells having an equal or unequal area (three longitudinal beams 30 divide the rectangular frame 10 into four individual cells). The plurality of frame rods 20 are evenly disposed in the three individual cells, and each of the plurality of frame rods 20 is arranged transversely. That is, each of the plurality of frame rods 20 is disposed along a same direction as the two longitudinal rods 14 and the two longitudinal beams 30. A length of each of the plurality of frame rods 20 is shorter than a length of each of the two longitudinal beams 30, and each end of each of the plurality of frame rods 20 is connected to one of the two longitudinal rods 14 or one of the two longitudinal beams 30. It can be understood that some of the plurality of frame rods 20 located on a left side and a right side of the bed skeleton are connected between one of the two longitudinal rods 14 and one of the two longitudinal beams 30. The others of the plurality of frame rods 20 that are located on a middle of the bed skeleton are connected between the two longitudinal beams 30.

The two longitudinal beams 30 between the two transverse rods 12 not only improve strength of the rectangular frame 10, but also enable the plurality of frame rods 20 to be configured to be disposed transversely, so that the length of each of the plurality of frame rods 20 is shorter, deformation resistance is greatly improved, and strength of the plurality of frame rods 20 can be improved. Thereby, an overall number of the plurality of frame rods 20 is reduced, and finally a total amount of material of the plurality of frame rods 20 reduced by reducing the overall number of the plurality of frame rods 20 is enough to offset the two longitudinal beams 30, which also improves the stability of the bed skeleton without increasing an overall weight of the bed skeleton.

Preferably, an inner side of each of the two transverse rods 12 is disposed with one or more U-shaped seats 121, and each end of each of the two longitudinal beams 30 is supported on the one or more U-shaped seats 121. Each end of each of the two longitudinal beams 30 and the one or more U-shaped seats 121 are detachably buckled to each other. During an installation process, it is only necessary to insert the two longitudinal beams 30 from top to bottom.

Preferably, a left inner side and a right inner side of the one or more U-shaped seats 121 respectively comprises a protruding tongue 122, and a left side and a right side of each end of each of the two longitudinal beams 30 respectively comprises a buckle hole 32. The protruding tongue 122 is inserted into the buckle hole 32.

Preferably, a bottom surface of the one or more U-shaped seats 121 comprises a position-limiting block 123, and a bottom surface of each end of each of the two longitudinal beams 30 comprises a position-limiting hole 34. The position-limiting block 123 is inserted into the position-limiting hole 34.

Preferably, each end of each of the plurality of frame rods 20 is folded down vertically to form a vertical hook 22, each of the two longitudinal rods 14 and each of the two longitudinal beams 30 comprise insertion holes. The vertical hook 22 is inserted into a corresponding one of the insertion holes.

Preferably, each end of each of the plurality of frame rods 20 is flattened and folded down to form the vertical hook. In addition, a plastic buckle 40 is disposed in each of the insertion holes. The plastic buckle 40 comprises one or more slots, and the vertical hook 22 is inserted into the one or more slots. The plastic buckle 40 is disposed on each of the two longitudinal rods 14 and each of the two longitudinal beams 30, so that the vertical hook 22 of each end of each of the plurality of frame rods 20 can be inserted more firmly.

Preferably, an anti-releasing structure is disposed between the vertical hook 22 and the plastic buckle 40. For example, the vertical hook 22 comprises a recessing hole, and the one or more slots of the plastic buckle 40 comprise a protruding point.

Preferably, some of the one or more slots disposed on the two longitudinal beams are two slots. In this way, the plurality of frame rods 20 can be installed on a left side and a right side of each of the two longitudinal beams 30, so that some of the plurality of frame rods 20 can be aligned in a straight line.

Preferably, each end of each of the two transverse rods 12 and each end of each of the two longitudinal rods 14 are transitionally connected to each other through an upright column 50. In some embodiments, each end of each of the two transverse rods 12 and each end of each of the two longitudinal rods 14 can also be directly connected to each other.

Preferably, each of the two transverse rods 12 can be folded in half, each end of each of the two longitudinal rods 14 is connected to the upright column 50, and each end of each of the two transverse rods 12 and the upright column 50 are locked together by bolts.

Figure 10:
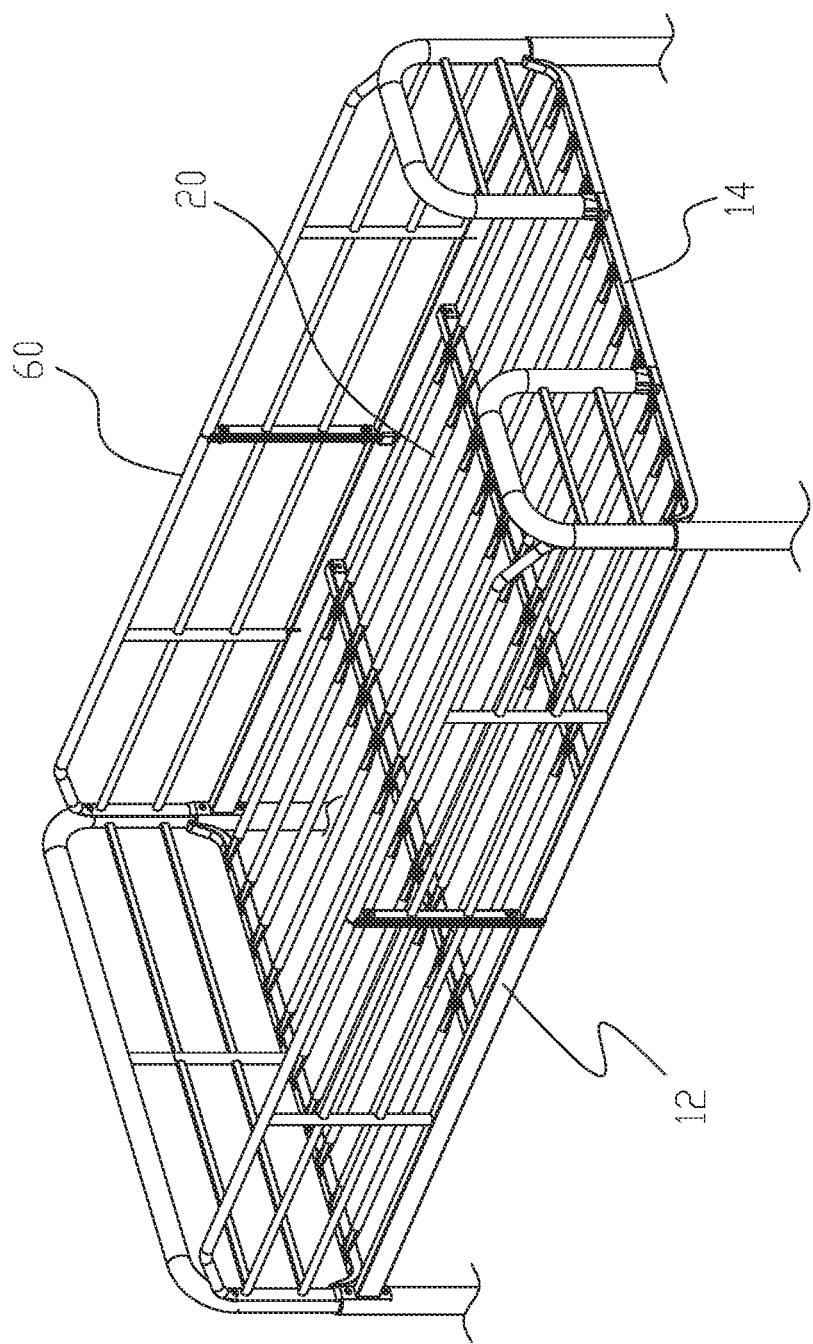
FIG. 10 illustrates a perspective view of a bed skeleton of an iron frame bed with an alternative structure.

Referring to FIG. 10, it can be understood that if the iron frame bed is a double-layer iron bed (i.e., a bunk-bed), the bed skeleton is applied as an upper bed bunk of the iron frame bed, and a barrier 60 can be disposed on the two transverse rods 12 and the two longitudinal rods 14. Or, it can also be understood that the two transverse rods 12 and the two longitudinal rods 14 are a lower bar of the barrier 60.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:
1. A bed skeleton of an iron frame bed, comprising:
a rectangular frame,
a plurality of frame rods, and
at least two and no more than three longitudinal beams, wherein:
the rectangular frame comprises two transverse rods symmetrically parallel to each other in a front-and-rear direction and two longitudinal rods symmetrically parallel to each other in a left-and-right direction,
a length of each of the two transverse rods is greater than a length of each of the two longitudinal rods,
the at least two and no more than three longitudinal beams divide the rectangular frame into three or four individual cells,
the plurality of frame rods are evenly disposed in the three or four individual cells,
each of the plurality of frame rods is arranged transversely,
a length of each of the plurality of frame rods is shorter than a length of each of the at least two and no more than three longitudinal beams, and
two ends of corresponding ones of the plurality of frame rods in a row are connected to one side of a first one of the two longitudinal rods, two sides of the at least two and no more than three longitudinal beams, one side of a second one of the two longitudinal rods in sequence.

2. The bed skeleton of an iron frame bed according to claim 1, wherein:
an inner side of each of the two transverse rods is disposed with one or more U-shaped seats,
each end of each of the at least two and no more than three longitudinal beams is supported on a corresponding one of the one or more U-shaped seats, and
each end of each of the at least two and no more than three longitudinal beams and the corresponding one of the one or more U-shaped seats are detachably buckled to each other.

3. The bed skeleton of an iron frame bed according to claim 2, wherein:
a left inner side and a right inner side of each of the one or more U-shaped seats respectively comprise a protruding tongue,
a left side and a right side of each end of each of the at least two and no more than three longitudinal beams respectively comprise a buckle hole, and
the protruding tongue is configured to be disposed in the buckle hole.

4. The bed skeleton of an iron frame bed according to claim 3, wherein:
a bottom surface of each of the one or more U-shaped seats comprises a position-limiting block,
a bottom surface of each end of each of the at least two and no more than three longitudinal beams comprises a position-limiting hole, and
the position-limiting block is configured to be disposed in the position-limiting hole.

5. The bed skeleton of an iron frame bed according to claim 2, wherein:
a bottom surface of each of the one or more U-shaped seats comprises a position-limiting block,
a bottom surface of each end of each of the at least two and no more than three longitudinal beams comprises a position-limiting hole, and
the position-limiting block is configured to be disposed in the position-limiting hole.

6. The bed skeleton of an iron frame bed according to claim 1, wherein:
   each end of each of the plurality of frame rods is folded down vertically to form a vertical hook,
   each of the two longitudinal rods and each of the at least two and no more than three longitudinal beams comprise insertion holes, and
   the vertical hook is configured to be disposed in a corresponding one of the insertion holes.

7. The bed skeleton of an iron frame bed according to claim 6, wherein:
   each end of each of the plurality of frame rods is flattened and folded down to form the vertical hook,
   a plastic buckle is disposed in each of the insertion holes,
   the plastic buckle comprises one or more slots, and
   the vertical hook is configured to be disposed in a corresponding one of the one or more slots.

8. The bed skeleton of an iron frame bed according to claim 7, wherein:
   the one or more slots of the plastic buckle disposed on a corresponding one of the at least two and no more than three longitudinal beams comprise two slots.

9. The bed skeleton of an iron frame bed according to claim 7, wherein:
   an anti-releasing structure is disposed between the vertical hook and the plastic buckle.

10. The bed skeleton of an iron frame bed according to claim 9, wherein:
    the one or more slots of the plastic buckle disposed on a corresponding one of the at least two and no more than three longitudinal beams comprise two slots.

11. The bed skeleton of an iron frame bed according to claim 1, wherein:
    each end of each of the two transverse rods and each end of each of the two longitudinal rods are directly connected to each other, or
    each end of each of the two transverse rods and each end of each of the two longitudinal rods are transitionally connected to each other through an upright column.

12. The bed skeleton of an iron frame bed according to claim 1, wherein:
    each end of each of the two transverse rods and each end of each of the two longitudinal rods are transitionally connected to each other through an upright column,
    each of the two transverse rods is configured to be folded in half,
    the at least two and no more than three longitudinal beams are two longitudinal beams,
    the two longitudinal beams divide the rectangular frame into three individual cells,
    each end of each of the two longitudinal rods is connected to the upright column, and
    each end of each of the two transverse rods and the upright column are locked together by bolts.

* * * * *